(12) United States Patent
Zhou et al.

(10) Patent No.: US 12,352,994 B2
(45) Date of Patent: Jul. 8, 2025

(54) ELECTRICAL CONVERTER PLUG WITH INDICATOR LIGHT, AND CONVERTER PLUG ASSEMBLY WITH POSITIONING BRACKET

(71) Applicant: Chengli Li, Suzhou (CN)

(72) Inventors: Junwu Zhou, Suzhou (CN); Quanguo Fu, Suzhou (CN)

(73) Assignee: Chengli Li, Suzhou (CN)

( * ) Notice: Subject to any disclaimer, the term of this patent is extended or adjusted under 35 U.S.C. 154(b) by 523 days.

(21) Appl. No.: 17/937,051

(22) Filed: Sep. 30, 2022

(65) Prior Publication Data

US 2024/0045129 A1 Feb. 8, 2024

(30) Foreign Application Priority Data

Aug. 5, 2022 (CN) .......................... 202210936775.4
Aug. 5, 2022 (CN) .......................... 202222061765.9

(51) Int. Cl.
  *F21V 8/00* (2006.01)
  *H01R 13/502* (2006.01)
  *H01R 13/621* (2006.01)
  *H01R 31/06* (2006.01)

(52) U.S. Cl.
  CPC ......... *G02B 6/0008* (2013.01); *H01R 13/502* (2013.01); *H01R 13/621* (2013.01); *H01R 31/065* (2013.01)

(58) Field of Classification Search
  CPC .. G02B 6/0008; H01R 13/502; H01R 13/621; H01R 31/065; H01R 13/6675; H01R 13/6395; H01R 24/68; H01R 13/7172; H01R 27/00; H01R 2105/00; H01R 24/38; H01R 25/006; H01R 31/06; H01R 13/631; Y02T 10/70

See application file for complete search history.

(56) References Cited

U.S. PATENT DOCUMENTS

| | | | |
|---|---|---|---|
| 9,229,153 B2 * | 1/2016 | Wang | ................. F21V 21/0832 |
| 11,804,678 B2 * | 10/2023 | Zhou | ................. H01R 31/065 |
| 2006/0226808 A1 * | 10/2006 | Hung | ................. H01R 31/065 320/111 |

(Continued)

FOREIGN PATENT DOCUMENTS

FR  3030952 A1 * 6/2016

*Primary Examiner* — Abdullah A Riyami
*Assistant Examiner* — Nader J Alhawamdeh
(74) *Attorney, Agent, or Firm* — Chen Yoshimura LLP

(57) ABSTRACT

An indicator light, an electrical converter plug, a positioning bracket, and an electrical converter plug assembly. The indicator light for indicating a working status of the electrical device includes a light guide rod having opposite first and second ends, and a light shade, disposed at the first end of the light guide rod and including multiple indicating surfaces facing different directions. When the indicator light is installed on the electrical device, the second end of the light guide rod faces a light source inside the electrical device, and light from the light source is guided by the light guide rod to the light shade and emitted in the multiple directions by the light shade, allowing the user to observe the light from multiple angles. Further, a positioning bracket affixes the electrical converter plug to the power outlet socket, ensuring secure contact, prolonging product life, and eliminating safety threat.

15 Claims, 7 Drawing Sheets

(56) References Cited

U.S. PATENT DOCUMENTS

| | | | |
|---|---|---|---|
| 2010/0029109 A1* | 2/2010 | Lam .................... | H01R 13/665 |
| | | | 439/620.21 |
| 2016/0044447 A1* | 2/2016 | Tetreault ............. | H01R 31/065 |
| | | | 439/620.21 |
| 2024/0045129 A1* | 2/2024 | Zhou ................... | H01R 13/502 |

* cited by examiner

ELECTRICAL CONVERTER PLUG WITH INDICATOR LIGHT, AND CONVERTER PLUG ASSEMBLY WITH POSITIONING BRACKET

BACKGROUND OF THE INVENTION

Field of the Invention

This invention relates to electrical accessories, and in particular, it relates to an electrical converter plug with indicator lights, and an electrical converter plug assembly with a positioning bracket.

Description of Related Art

With the increased use of electric vehicles, the need for high-power electrical converter plugs is increasing. Many electrical converter plugs have indicator lights to indicate the power consumption status of the converter plug and associated electrical load. In conventional converter plugs, the indicator light typically includes a light guide rod and a light shade which are two separate components. Such structures are relatively complex and the light transmitting effect is relatively poor. Further, the indicator light typically has only one indicating surface, and are only observable to the user from a particular angle, which limits its effect. Moreover, when a conventional converter plug is plugged into the electrical socket, the plug is positioned and connected to the socket simply by the prongs that are inserted into the socket holes. This connection is not secure and can often result in poor contact, and the plug can even fall off of the socket, which can disrupt normal use and cause a safety threat.

SUMMARY

To solve the above problems, the present invention is directed to an electrical converter plug with an indicator light and a plug assembly with a positioning bracket.

To achieve the above objects, the present invention provides an indicator light for indicating a working status of an electrical device, the indicator light including: a light guide rod having a first end and a second end opposite to each other; and a light shade, disposed at the first end of the light guide rod, and including multiple indicating surfaces facing different directions, wherein when the indicator light is installed on the electrical device, the second end of the light guide rod faces a light source inside the electrical device, whereby light from the light source is guided by the light guide rod to the light shade and emitted in the multiple directions by the light shade.

By providing the multiple indicating surfaces, the light is visible to the user from multiple angles.

In some embodiments, the light guide rod and light shade are an integral one piece structure.

In some embodiments, the indicator light is located near an edge of a shell of the electrical device.

In some embodiments, the light shade includes a snap hook configured to connect to a shell of the electrical device.

In some embodiments, the multiple indicating surfaces of the light shade include a front indicating surface, a side indicating surface, and a slanted indicating surface that connects the front and side indicating surfaces.

In another aspect, the present invention provides an electrical converter plug, which includes: a shell; and the indicator light described above, disposed on the shell, configured to indicate a working status of the electrical converter plug.

In another aspect, the present invention provides a positioning bracket for affixing an electrical converter plug to a power outlet socket, which includes: a body, which includes a first connecting member and second connecting members, wherein the first connecting member is configured to connect to the power outlet socket, and the second connecting members are configured to connect to the electrical converter plug after prongs of the electrical converter plug are inserted into socket holes of the power outlet socket, so as to affix the electrical converter plug to the socket.

In some embodiments, the first connecting member and the second connecting members are configured to respectively connect to the power outlet socket and the electrical converter plug after a 180-degree rotation of the positioning bracket.

In some embodiments, the second connecting members include elongated slots, and wherein the positioning bracket is adjustably connected to the electrical converter plug and adjustable in a direction of insertion of the electrical converter plug into the power outlet socket.

In some embodiments, the second connecting members include snap hooks, wherein the electrical converter plug includes snap slots on its two sides configured to engage the snap hooks.

In some embodiments, the body includes a bottom plate and two side plates extending perpendicularly from the bottom plate, wherein the bottom plate includes the first connecting member and the side plates include the second connecting members.

In some embodiments, the first connecting member includes a plurality of positioning holes that correspond to installation holes on a faceplate of the power outlet socket.

In some embodiments, the two side plates are located on two sides of the bottom plate, and a third side of the bottom plate has a cutout which exposes a raised portion of the socket, to allow the positioning bracket to be affixed to the socket via the first connecting member.

In some embodiments, the two side plates include the second connecting members, wherein the electrical converter plug includes screw holes on its two side corresponding to the second connecting members, configured to be connected to the second connecting members by screws.

In another aspect, the present invention provides an electrical converter plug assembly, which includes: an electrical converter plug; and the positioning bracket described above, configured to connect the electrical converter plug to a power outlet socket.

In another aspect, the present invention provides an electrical converter plug assembly, which includes: an electrical converter plug, including a shell and an indicator light described above, disposed on the shell and configured to indicate a working status of the electrical converter plug; and a positioning bracket described above, configured to affix the electrical converter plug to a power outlet socket.

BRIEF DESCRIPTION OF THE DRAWINGS

Preferred embodiments of the present invention are described with reference to the drawings.

DETAILED DESCRIPTION OF PREFERRED EMBODIMENTS

Preferred embodiments of the present and their applications are described below. It should be understood that these descriptions describe embodiments of the present invention but do not limit the scope of the invention. When describing the various components, directional terms such as "up," "down," "left", "right", "top," "bottom" etc. are not absolute but are relative. These terms may correspond to the views in the various illustrations, and can change when the views or the relative positions of the components change.

First Embodiment

Figure 1:
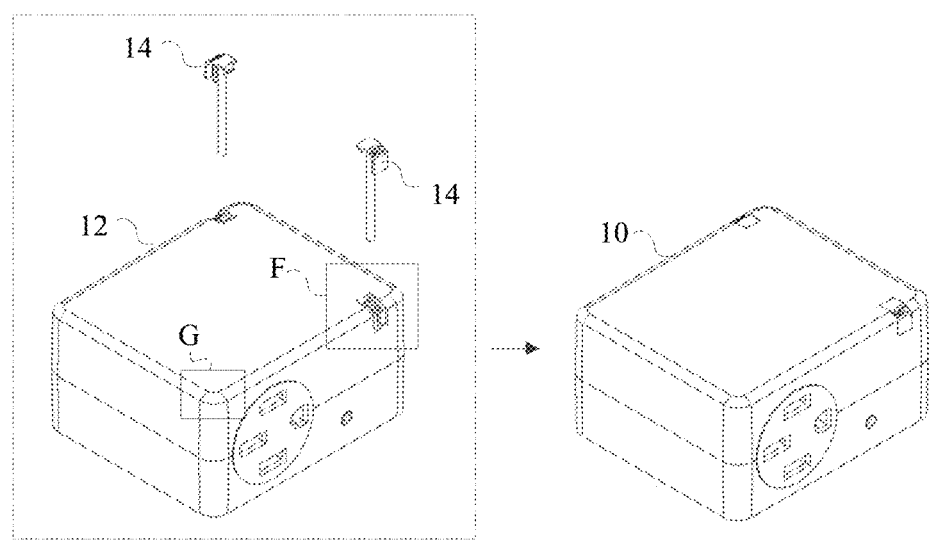
FIG. 1 illustrates an electrical converter plug incorporating an indicator light according to an embodiment of the present invention.
Figure 2A:
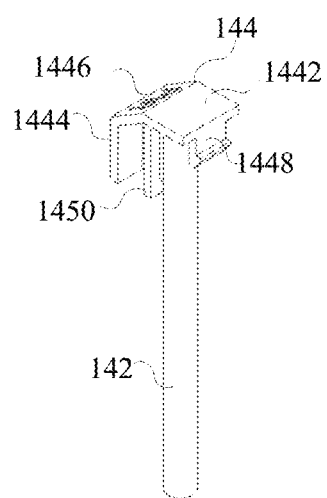
FIG. 2A illustrates the indicator light in the electrical converter plug of FIG. 1.
Figure 2B:
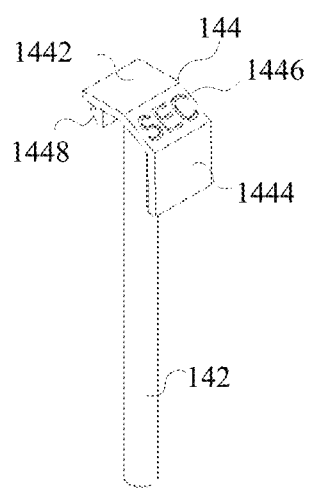
FIG. 2B illustrates the indicator light of FIG. 2A from another angle.
Figure 3:
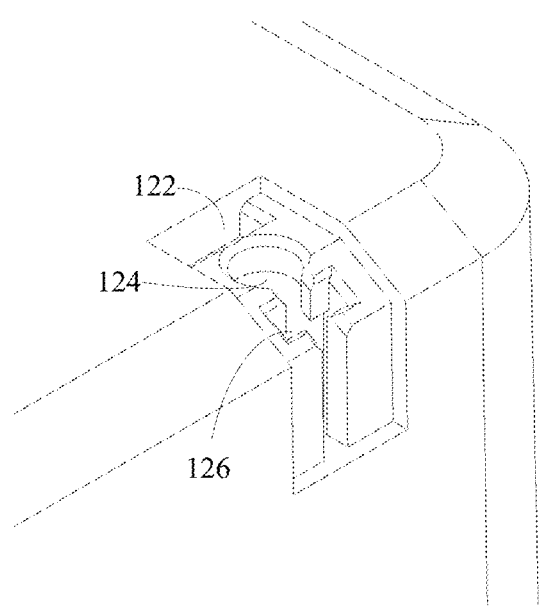
FIG. 3 is an enlarged view illustrating a portion F of the electrical converter plug of FIG. 1.
Figure 4:
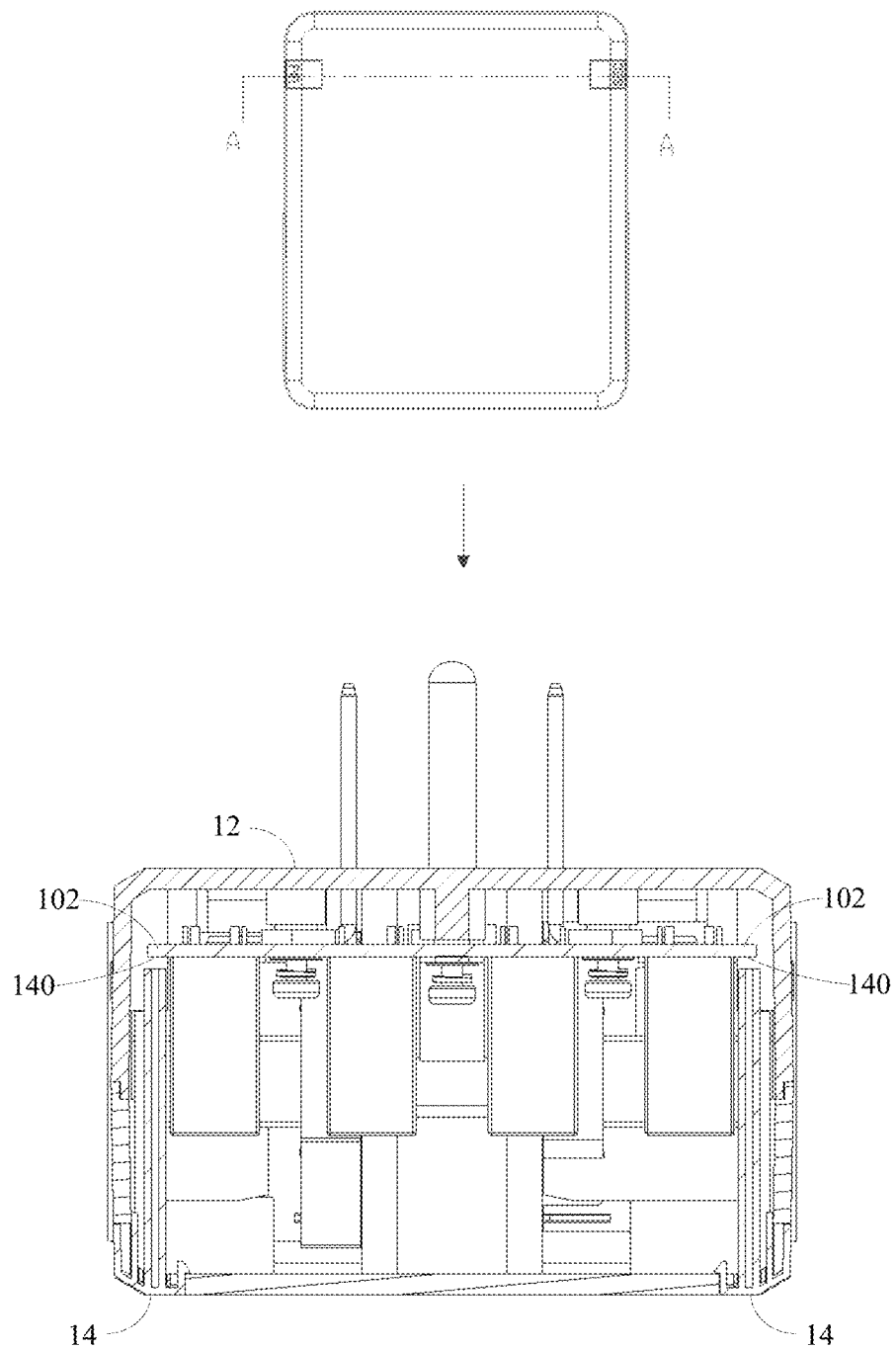
FIG. 4 is a cross-sectional view illustrating an electrical converter plug incorporating an indicator light according to an embodiment of the present invention.

FIG. 1 illustrates an electrical converter plug incorporating an indicator light according to an embodiment of the present invention. FIGS. 2A and 2B illustrate the indicator light of the electrical converter plug of FIG. 1 from two different angles. FIG. 3 is an enlarged view illustrating a portion F of the electrical converter plug of FIG. 1. FIG. 4 is a cross-sectional view of the electrical converter plug along the ling AA illustrating internal structures of the converter plug.

As shown in FIGS. 1-4, the electrical converter plug 10 has a shell 12 with a light source 140 inside, and one or more indicator lights 14. Each indicator light 14 includes a light guide rod 142 and a light shade 144. The light guide rod 142 has two opposing ends. The light shade 144 is disposed at the first end of the light guide rod 142 and has multiple indicating surfaces facing different directions. When the indicator light 14 is assembled in the electrical converter plug 10, the second end of the light guide rod 142 faces the light source 140. The light from the light source 140 is guided by the light guide rod 142 to the light shade 144, and is emitted in multiple directions by the light shade 144.

In some embodiments, the light source 140 is disposed on a PCB (printed circuit board) 102 inside the shell 12. The second end of the light guide rod 142 is aligned with the light source 140, and the first end is located at an edge of the shell 12. The light shade 144 at the first end of the light guide rod 142 is embedded at the edge of the shell 12 so that the multiple indicating surfaces are exposed and face multiple direction to emit the indicator light. In this embodiment, by providing the light guide rod 142 at the edge of the shell 12, the light from the light source within the shell 12 can be guided to multiple facets of the shell adjacent the edge, and be emitted by the multiple indicating surfaces of the light shade 144 in multiple different directions. This way, the user may observe the indicator light from different directions.

It should be noted that while the indicator light 14 in this embodiment is installed on a converter plug, the invention is not limited to such a plug, and can be implemented in any electrical accessories that can benefit from an indicator light, such as an electrical outlet box, a switch box, a power strip, etc.

In some embodiment, the light source 140 is an LED (light emitting diode) light source, such as an SMD (Surface Mount Device) LED which can be mounted on the PCB. Such light sources are compact, durable, and energy efficient. Using an SMD LED design can reduce the size of the converter plug and reduce cost. In some embodiment, the light source 140 may be a single-color light source or a multiple-color light source. Moreover, the light source 140 may be controlled to vary its color and/or light intensity, to flash at various frequencies, etc. to indicate different operation status of the converter plug (e.g. to indicate the power consumption status of the load connected to the converter plug).

In some embodiments, the light guide rod 142 is made of a polycarbonate (PC) material, a polymethyl methacrylate (PMMA) material, or other suitable materials, which preferably have high light transmissivity and heat resistance and are environmentally friendly. In some embodiments, the light guide rod 142 may be disposed perpendicular to the PCB (i.e. it is a straight cylinder), or disposed at an inclined angle on the PCB (i.e. it is an inclined cylinder), or have a bent shape, depending on the spatial arrangements of other components within the shell 12.

Preferably, the light guide rod 142 is disposed perpendicular to the PCB 102, and correspondingly, the light source 140 is disposed on the PCB at a location corresponding to the edge of the shell 12, i.e., near the edge of the PCB, to minimize the length of the light path which in turn minimizes light loss and maximizes light conducting efficiency.

Preferably, the light guide rod 142 and the light shade 144 are formed integrally as one piece of the same material, so that the piece can serve both as a light guide and as a light shade. This integral design can reduce light loss when light is transmitted from the light guide rod 142 to the light shade 144, thereby improving light transmission efficiency. At the same time, it reduces assembling complexity of the converter plug and improves manufacturing efficiency.

In some embodiments, such as shown in FIGS. 2A and 2B, the multiple indicating surfaces of the light shade 144 include three indicating surfaces: a front indicating surface 1442, a side indicating surface 1444, and a slanted indicating surface 1446 that connects the other two indicating surfaces. The front indicating surface 1442 and the side indicating surface 1444 are located on two surfaces of the shell 12, and the slanted indicating surface 1446 is located at a chamfered or rounded edge of the shell 12. In other embodiments, the multiple indicating surfaces of the light shade 144 may include only the front indicating surface 1442 and slanted indicating surface 1446, or only side indicating surface 1444 and slanted indicating surface 1446, or only front indicating surface 1442 and side indicating surface 1444.

In other embodiments, the first end (light emitting end) of the indicator light 14 may be located at a vertex of the shell 12 (i.e., where edges intersect, which may be deemed a special case of the edge location). Depending on the shape of the vertex, the light shade 144 may be designed to have various numbers of indicating surfaces. For example, in the corner area G shown in FIG. 1, where three surfaces intersect at three chamfered or rounded edges and the three chamfered or rounded edges intersect at a chamfered or rounded vertex, the light shade 144 may be designed to have two to seven indicating surfaces corresponding to two to seven of the facets of the shell 12.

In some embodiments, the light shade 144 may be mounted on the shell 12 by snaps, pins, adhesive, or other suitable means. Snaps are preferred. In one embodiment, the light shade 144 extends downwardly and outwardly to form a resilient snap hook 1448, configured to engage a corresponding step feature on the inside of the shell 12 so as to secure the indicator light 14 against the side wall of the shell. This snap structure is easy to install and uninstall, making it convenient to inspect the parts and/or replace the parts. The snap hook 1448 is preferably formed integrally with the light guide rod 142 and light shade 144, which makes it easy to manufacture.

In some embodiments, the light shade 144 further includes an installation positioning member 1450, which helps to position the indicator light 14 for accurate installation and to ensure stability of the assembly that has been installed. For example, FIG. 3 shows the structure of a regions F of the shell 12 having receiving structures for receiving the indicator light 14. The receiving structures includes a first receiving slot 122, second receiving slot 124, and third receiving slot 126. The first receiving slot 122 is shaped to receive the snap hook 1448; the second receiving slot 124 is shaped to receive the light guide rod 142, and the third receiving slot 126 is shaped to receive the installation positioning member 1450.

It should be noted that, while the embodiment shown in FIGS. 1-4 has two indicator lights located symmetrically near two sides of the converter plug, the invention is not limited to a particular number of indicator lights. The number of indicator lights may change depending on the size, shape, and indication need of the electrical device.

Second Embodiment

Figure 5:
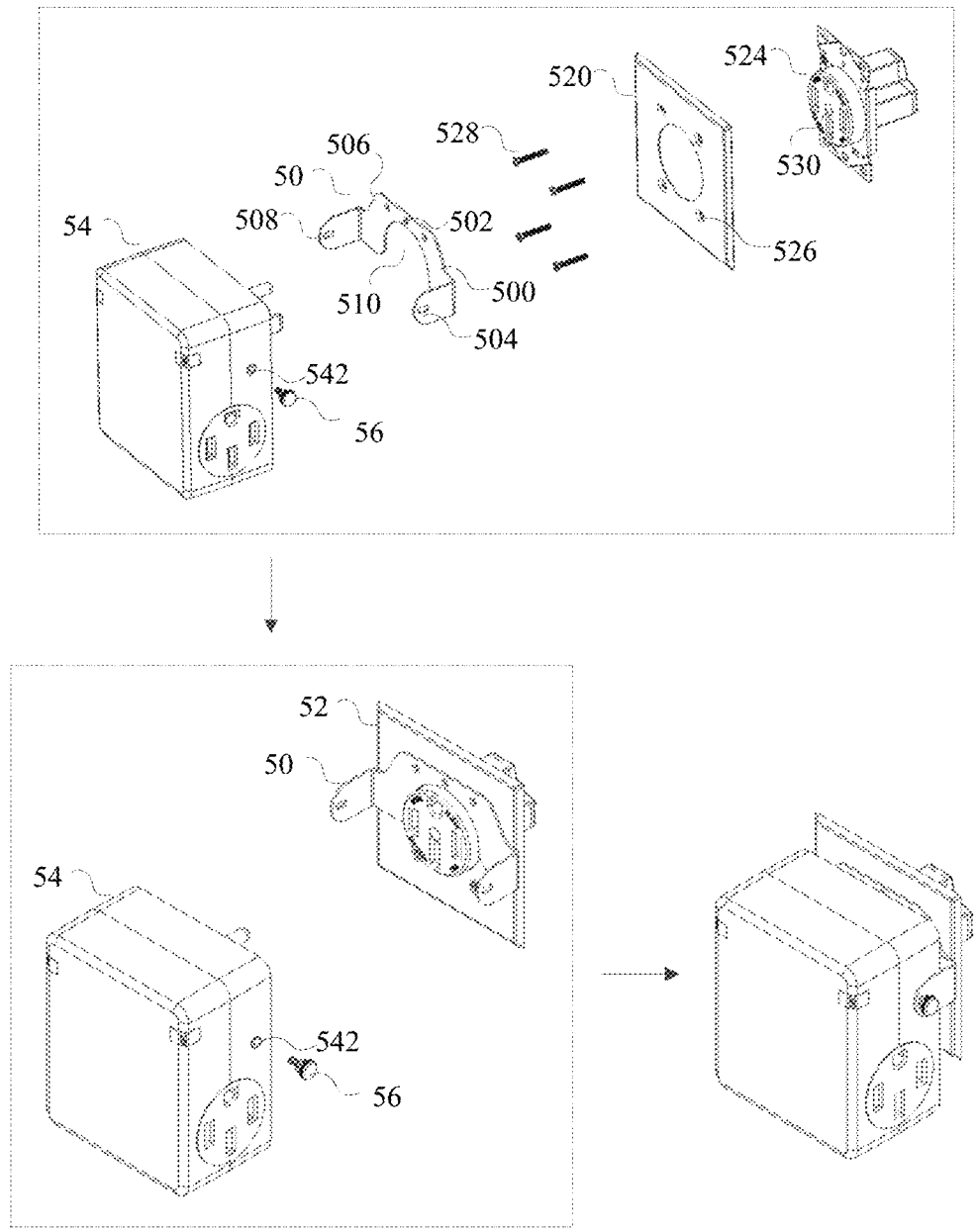
FIG. 5 illustrates a converter plug assembly incorporating a positioning bracket according to another embodiment of the present invention.

FIG. 5 illustrates a converter plug assembly incorporating a positioning bracket according to a second embodiment of the present invention. As shown in FIG. 5, the converter plug assembly includes a positioning bracket 50 and a converter plug 54. The positioning bracket 50 has a body 500, which includes a first connecting member 502 and second connecting members 504. The first connecting member 502 is configured to connect to the power outlet socket 52 (the power outlet socket 52 shown in FIG. 5 includes a faceplate 520 and an outlet structure 524). The second connecting members 504 are configured to connect to the converter plug 54 after the prongs of the converter plug are inserted into the socket holes, so as to affix the converter plug to the socket.

In this embodiment, the positioning bracket 50 is used to affix the converter plug to the power outlet socket. Compared to conventional technology where the plug is only affixed to the socket by inserting the prongs of the plug into the socket holes, the plug assembly of this embodiment more securely connect the plug to the socket. Moreover, the assembly can reduce the stress on the prongs, which improves electrical contact between the plug and the socket, prolongs the life of the plug, and reduces safety threat.

Figure 6:
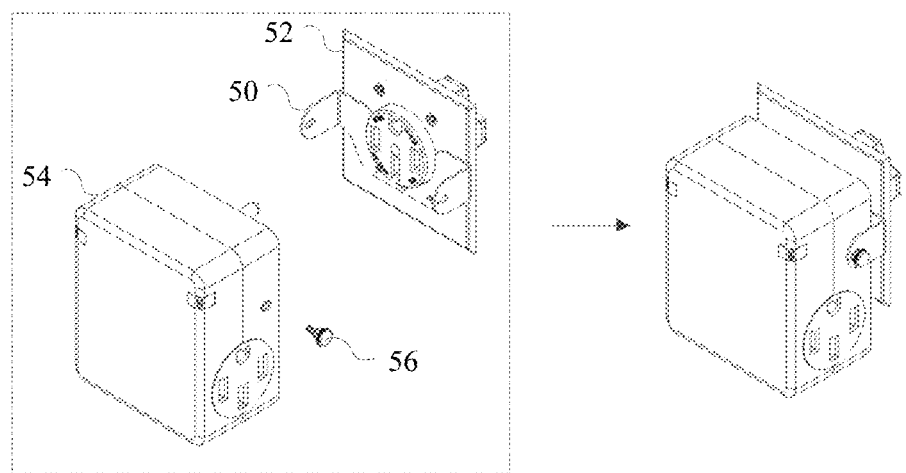
FIG. 6 illustrates a converter plug assembly incorporating a positioning bracket in a variation of the embodiment of FIG. 5.

In the variation shown in FIG. 6, the same positioning bracket 50 is rotated 180 degrees compared to its orientation shown in FIG. 5. The rotated positioning bracket 50 is mounted on the power outlet socket 52, and the second connecting members 504 are located at the same horizontal line (the horizontal center line of the socket) before and after the 180-degree rotation. The second connecting members 504 are symmetrically disposed on two ends of the body 500.

The converter plug 54 has connection holes 542 at positions corresponding to the second connecting members 504. In other words, the positioning bracket 50 may be mounted on the power outlet socket 52 in two different orientations (180-degree rotation with respect to each other) without affecting the mounting of the converter plug 54 to the positioning bracket. This enhances the flexibility and applicability of the positioning bracket 50, and can save time during installation.

Preferably, the second connecting members 504 of the positioning bracket 50 include elongated slots, which extend in a direction of insertion of the prongs into the socket. Thus, the relative position between the converter plug 54 and positioning bracket 50 is adjustable in a range corresponding to the length of the elongated slots, in order to adapt to different types of plugs. In some embodiment, the connection holes 542 on the converter plug 54 corresponding to the second connecting members 504 are screw holes, and screws 56 pass through the elongated slots to threadedly engage the connection hole 542, so as to affix the converter plug 54 to the positioning bracket 50, thereby affixing the converter plug 54 to the socket 52. In some other embodiments, the screws 56 may be replaced by pins, and the screw holes 542 may be replaced by non-threaded holes.

In some embodiments, the body 500 includes a bottom plate 506, and two side plates 508 extending perpendicularly from the bottom plate 506. The bottom plate 506 has the first connecting member 502, and the side plates 508 have the second connecting members 504. In other embodiments, the second connecting members 504 may be connected to the converter plug 54 by snaps. For example, snap slots may be provided on the two sides of the converter plug 54, and snap hooks may be provided on the two side plates of the positioning bracket.

Preferably, the positioning bracket 50 is affixed to the socket 52 using the same screws 528 that affix the faceplate 520 to the outlet structure 524 in the wall or elsewhere. To achieve this, the first connecting member 502 include a plurality of positioning holes that correspond to some of the installation holes 526 on the faceplate 520. To install the positioning bracket 50, the corresponding screws 528 are unscrewed from the installation holes 526 of the faceplate 520, then passed through the positioning holes 502 of the positioning bracket 50, and screwed back into the installation holes 526. This affixes the positioning bracket 50 to the socket 52. Using this design, where the positioning holes 502 (first connecting member) correspond to the native installation holes of the faceplate, the screws of the faceplate can be directly used to affix the positioning bracket to the socket, simplifying the structure and saving materials. In some embodiments, the first connecting member 502 includes at least three positioning holes, to adapt to different types of sockets (such as sockets that have three installation holes, or sockets that have two installation holes).

In some embodiments, the two side plates 508 are located on two sides of the bottom plate 506, and a third side of the bottom plate 506 has a cutout 510 which exposes the plug holes of the socket, to allow the positioning bracket 50 to be affixed to the socket 52 via the first connecting member 502. Some sockets have a raised portion 530 around the plug holes, and the cutout 510 is shaped so that the raised portion 530 (e.g. a round shape, or a square shape) pass through the cutout without a gap between the edge of the cutout and the raised portion. In some other embodiments, a shape adapter is used to change the shape of the cutout 510 from a rectangular shape to an arc shape to suit different types of sockets. More specifically, the cutout of the bottom plate 506 is a rectangular shape, and the shape adapter is a plate that has a rectangular outer shape matching the shape of the cutout, and a smaller arc shaped cutout. When the raised portion of the socket is rectangular, the shape adapter plate is unnecessary. When the raised portion of the socket is round, the shape adapter plate is inserted in the cutout of the bottom plate 506, so that no gap is left between the edge of the shape adapter and the raised portion of the socket 52.

Third Embodiment

This embodiment provides a converter plug assembly, which includes a converter plug and a positioning bracket. The converter plug includes a shell and an indicator light disposed on the shell to indicate the working status of the converter plug. The positioning bracket is configured to connect to the electrical converter plug and affix it to a socket.

The converter plug is similar to that of the first embodiment, and positioning bracket is similar to that of the second embodiment.

While the present invention is described above using specific examples, these examples are only illustrative and do not limit the scope of the invention. It will be apparent to those skilled in the art that various modifications, additions and deletions can be made to the electrical converter plug and plug assembly of the present invention without departing from the spirit or scope of the invention.

What is claimed is:

1. An indicator light for indicating a working status of an electrical device, the electrical device including a shell, the indicator light comprising:
    a light guide rod having a first end and a second end opposite to each other; and
    a light shade, disposed at the first end of the light guide rod, and formed of an integral one piece structure including multiple indicating surfaces that are joined together and face different directions,
    wherein when the indicator light is installed on the electrical device, the second end of the light guide rod faces a light source inside the electrical device and the multiple indicating surfaces are exposed on outer surfaces of the shell, whereby light from the light source is guided by the light guide rod to the light shade and emitted by the multiple indicating surfaces of the light shade to outside of the shell in the multiple directions.

2. The indicator light of claim 1, wherein the light guide rod and light shade are an integral one piece structure.

3. The indicator light of claim 1, wherein the indicator light is located near an edge of the shell of the electrical device.

4. The indicator light of claim 1, wherein the light shade includes a snap hook configured to connect to the shell of the electrical device.

5. The indicator light of claim 1, wherein the multiple indicating surfaces of the light shade include a front indicating surface, a side indicating surface, and a slanted indicating surface that connects the front and side indicating surfaces.

6. An electrical converter plug, comprising:
    the shell and the indicator light of claim 1 disposed on the shell, configured to indicate a working status of the electrical converter plug.

7. An electrical converter plug assembly, comprising:
    the electrical converter plug of claim 6; and
    a positioning bracket, configured to affix the electrical converter plug to a power outlet socket.

8. A positioning bracket for affixing an electrical converter plug to a power outlet socket, comprising:
    a body, which includes a first connecting member and second connecting members,
    wherein the first connecting member is configured to connect to the power outlet socket, and the second connecting members are configured to connect to the electrical converter plug after prongs of the electrical converter plug are inserted into socket holes of the power outlet socket, so as to affix the electrical converter plug to the socket, and wherein the first connecting member and the second connecting members are configured to respectively connect to the power outlet socket and the electrical converter plug after a 180-degree rotation of the positioning bracket.

9. The positioning bracket of claim 8, wherein the second connecting members include elongated slots, and wherein the positioning bracket is adjustably connected to the electrical converter plug and adjustable in a direction of insertion of the electrical converter plug into the power outlet socket.

10. The positioning bracket of claim 8, wherein the second connecting members include snap hooks, wherein the electrical converter plug includes snap slots on its two sides configured to engage the snap hooks.

11. The positioning bracket of claim 8, wherein the body includes a bottom plate and two side plates extending perpendicularly from the bottom plate, wherein the bottom plate includes the first connecting member and the side plates include the second connecting members.

12. The positioning bracket of claim 8, wherein the first connecting member includes a plurality of positioning holes that correspond to installation holes on a faceplate of the power outlet socket.

13. The positioning bracket of claim 11, wherein the two side plates are located on two sides of the bottom plate, and a third side of the bottom plate has a cutout which exposes a raised portion of the socket, to allow the positioning bracket to be affixed to the socket via the first connecting member.

14. The positioning bracket of claim 11, wherein the two side plates include the second connecting members, wherein the electrical converter plug includes screw holes on its two side corresponding to the second connecting members, configured to be connected to the second connecting members by screws.

15. An electrical converter plug assembly, comprising:
    an electrical converter plug; and
    the positioning bracket of claim 8, configured to connect the electrical converter plug to a power outlet socket.

* * * * *